(12) United States Patent
Johnson

(10) Patent No.: X9733
(45) Date of Patent: Jun. 16, 1836

(54) SHAVING LEATHER

(76) Inventor: Herkimer Johnson

Heckimer Johnson of Brooklyn Connecticut

Letters Patent,

The Schedule referred to in these Letters Patent and making part of the same containing a description in the words of the [illegible] of the said Heckimer Johnson himself of his improvement in the machine for shaving and smoothing all kind of tanned Leather"

To all to whom these presents shall come Be it Known that I Heckimer Johnson of the Town of Brooklyn in the County of Windham and State of Connecticut have invented a new and useful machine for shaving and smoothing leather and that the following is a full and exact description thereof (viz) a machine for shaving and smoothing all kinds of tanned leather with one or more knives. each side of the leather or skin can be shaved all of one thickness or varied to any desirable thickness. The machine may be varied to any size according to the widths of the leather to be shaved and smoothed. The length of the knives may be varied on the same shaft. The knives are placed on a wheel in the form of a cylinder and for neats leather or for common use the wheels or cylinders would consist of five iron wheels six inches diameter placed on an iron shaft about four feet in length and two and a half inches diameter at equal distances from each other. On these wheels would be placed nine knives two inches apart and one foot and a half long in an angular direction across the wheels by first screwing flat bars of iron one inch in width and half an inch on and across the wheels in the same length and shape of the knives. then screw the knives on them ground to an edge on the under side. Short knives are made use of in shaving [illegible] leather for the purpose of turning the leather for [illegible] the leather in any direction and for the purpose of shaving to any desirable thickness, the knives must be as long as the skins are wide. the machine is enclosed in a frame about four feet square with two of the top joists running over the corner posts about one foot. of their frame is a second perpendicular post two feet from the corner post and inserted into the top and lower and lower joist, - I then frame a joist three feet in length
one end into the second post with a mortise through it two feet from
the second post and the corner post fastened so as to slide up and down
and raised or lowered by means of screws placed on the top of
the sliding joist The cylinder of knives is placed on the top of the
frame one foot from the corner posts and under the centre of the
cylinder and on the sliding joist is placed an iron roller about three
inches diameter and about four feet long to draw the leather through
directly under the cylinder of knives. and I place two smaller
rollers of iron close to the large one and the botom one to be gear-
ed to the large one and the other one placed on the top of
the large one for the purpose of drawing the leather more directly
under the knives and over the large roller. By turning the cyl-
inder the leather is drawn throug the machine and shaved. The cyl-
inder is turned by a pulley or pinion four inches diameter placed
on the end of the shaft of the cylinder driven by a wheel thirty
inches diameter placed on the end of a shaft one inch diameter and
four feet in length with a belt from one to the other on which
is placed a crank. On the other end of the inch shaft is placed
a pulley or pinion two inches diameter for the purpose of turning
the iron rollers under the cylinder of knives, by placing on the end
of the three inch roller a wheel thirty inches in diameter with
a band or belt from the two inch pinion to the thirty inch wheel
on the top of the frame and opposite to the cylinder is placed one knife
in an angular frame for the purpose of shaving all kinds of leather
and also a rubber for smoothing leather both of which are moved in
the same manner by placing at the two corners of the two corners of
the frame two small pullies six inches diameter each on its own
shaft suspended by two posts each with a crank on the inside ends
of the shafts. on these cranks is placed a wrest that extends from
and fastened to the one knife and rubber for the purpose of moving
them backward and forward which by a quick motion will shave
leather placed under it on a beam eight inches wide and four inches thick the rubber in the same manner. the bands or belts which put in motion the single knife and rubber pass over a six inch pulley to and over a thirty inch wheel where a crank is fastened for the purpose of turning the cylinder. the belt for turning the rollers under the cylinder passes the thirty inch wheel and placed on the end of the three inch roller under the cylinder and from there to a pully two inches diameter by the side of the thirty inch wheel on the end of the one inch shaft, on the top of the one inch shaft is placed a roller for the purpose of drawing the leather under the single knife which is moved by a crank placed on the end of the one inch shaft which turns the roller that lys on the top and also puts the whole machine in motion the angular frame in which the single knife is placed may be raised or lowered for the purpose of shaving leather to any desirable thickness by means of screws at the corners of the frame that rises.

For a further illustration of my invention I refer to the model and drawing of the same deposited in the Patent Office. Cyd.

[illegible]

Witnesses }
Armin Bolles }
Daniel Nies }

Herkimer Johnson (1066 words)

(Patented 16. June 1836.)